US005203656A

United States Patent [19]

McKinlay

[11] Patent Number: 5,203,656
[45] Date of Patent: Apr. 20, 1993

[54] SELF-CENTERING, SELF-TIGHTENING FASTENER

[75] Inventor: Alistair N. McKinlay, Marina Del Ray, Calif.

[73] Assignee: Hong Kong Disc Lock Company, Limited, Hong Kong, Hong Kong

[21] Appl. No.: 762,395

[22] Filed: Sep. 19, 1991

[51] Int. Cl.$^5$ .............................................. F16B 39/24
[52] U.S. Cl. ..................................... 411/149; 411/332; 411/432; 411/533
[58] Field of Search ............... 411/149, 146, 144, 132, 411/154, 428, 332, 134, 293, 534, 533, 432, 144, 956, 960, 964, 965, 537

[56] References Cited

U.S. PATENT DOCUMENTS

| Re. 33,827 | 2/1992 | Terry ............................ 411/149 |
| 910,712 | 1/1909 | McCoy ........................ 411/149 X |
| 1,592,627 | 7/1926 | Egleston ...................... 411/951 X |
| 3,241,589 | 3/1966 | Enders .......................... 411/144 X |
| 3,253,727 | 8/1966 | Herpolsheimer . |
| 3,417,802 | 12/1968 | Oldenkott . |
| 4,134,438 | 1/1979 | Frieberg et al. ............ 411/531 X |
| 4,362,449 | 12/1982 | Hlinsky ........................ 411/156 |
| 4,969,788 | 11/1990 | Going .......................... 411/533 X |

FOREIGN PATENT DOCUMENTS

| 684466 | 11/1939 | Fed. Rep. of Germany ...... 411/149 |
| 060759 | 1/1955 | France .......................... 411/149 |
| 129964 | 1/1929 | Switzerland .................. 411/223 |

Primary Examiner—Rodney M. Lindsey
Attorney, Agent, or Firm—Charles W. Chandler

[57] ABSTRACT

A self-tightening, self-centering fastener device having a pair of washers having cam surfaces that generate a wedging force. One of the washers has a raised, annular crown for seating in an annular seat in the workpiece.

21 Claims, 2 Drawing Sheets

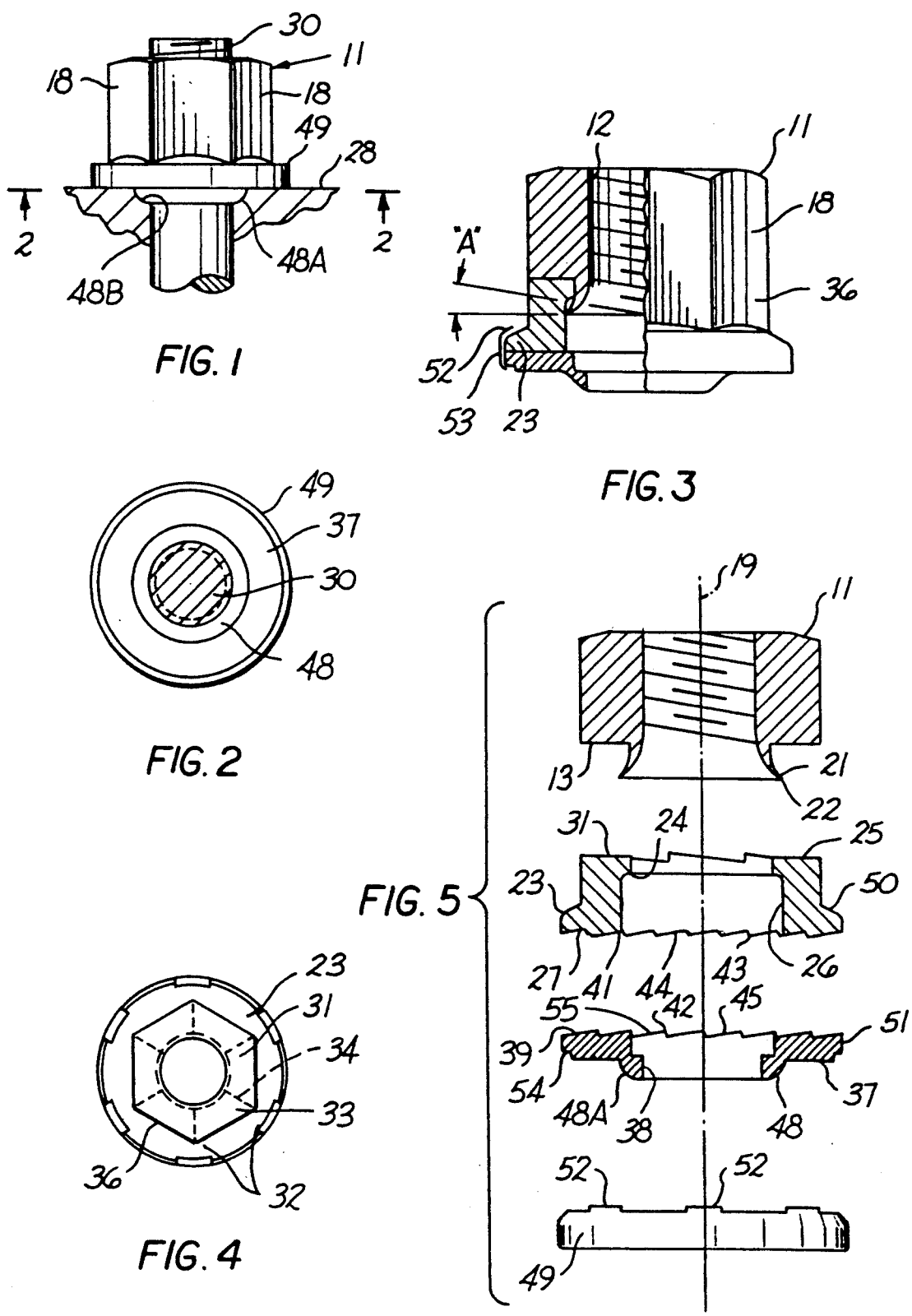

SELF-CENTERING, SELF-TIGHTENING FASTENER

BACKGROUND OF THE INVENTION

This invention relates to a self-tightening threaded fastener with multiple locking washers. In particular, it relates to a threaded nut having self-tightening means and a self-centering structure.

A variety of self-tightening fastening devices have been disclosed in the prior art. Such fastener devices accommodate a workpiece exposed to vibration. Some prior art devices may be found in U.S. Pat. No. 3,263,727 which issued to Arthur B. Herpolsheimer on Aug. 2, 1966; and U.S. Pat. No 3,417,802 which issued to Carl O. Oldenkott on Dec. 24, 1968. A commercially-available form of such device has long been marketed as a Disc-Lock, vibration proof, self-tightening, locking device.

Such devices usually have one or more washer-shaped pieces having inclined cams on one side and a series of ridges on the other. The washers are mounted so that the cam surfaces will mate. In a typical situation, the washers are mounted on a stud between a nut and the workpiece.

Vibration or shock will cause the stud or bolt to elongate. The nut tends to rotate loose. A self-tightening locking device prevents this since the cam rise angle is greater than the lead angle of the thread on the bolt. As the nut rotates relative to the washer, the preload is actually increased, further locking the nut.

When the bolt contracts, the inclined planes of the cam causes the nut to rotate back to its original position. The result is a fastening system that is vibration proof.

One shortcoming of a commercially available, self-tightening fastener is that it cannot be substituted for certain types of wheel nuts of the type having a raised partially spherical crown. The partially spherical crown is seated in a conical or spherical recess.

A form of a self-centering fastener assembly is disclosed in U.S. Pat. No. 4,362,449 which issued Dec. 7, 1982 to Emil J. Hlinsky.

SUMMARY OF THE INVENTION

The broad purpose of the present invention is to provide an improved self-centering, self-tightening fastener device that can be employed on a workpiece requiring a self-centering nut. In the preferred embodiment of the invention, one of the non-flexing locking washers, in contact with the workpiece, has a continuous annular shoulder or crown. The annular shoulder has a somewhat conical configuration adapted to seat into the conical or spherical seat of the workpiece so that when the nut is tightened, it forms a self-centering fastener assembly.

Still further objects and advantages of the invention will become readily apparent to those skilled in the art to which the invention pertains upon reference to the following detailed description.

BRIEF DESCRIPTION OF THE DRAWINGS

FIG. 1 is a side view of the preferred assembly on a stud extending from a workpiece.

FIG. 2 is a view as seen along lines 2—2 of FIG. 1.

FIG. 3 is an enlarged, fragmentary view of the preferred fastener assembly.

FIG. 4 is a top view of the two washers.

FIG. 5 is an exploded, cross-sectional view of a fastener and multiple locking washer assembly according to this invention.

DESCRIPTION OF THE PREFERRED EMBODIMENT

Figure 6:
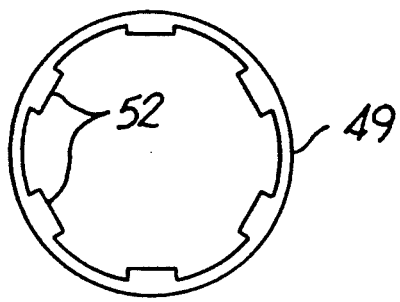
FIG. 6 is a view of a clip in the assembly in FIG. 1.
Figure 7:
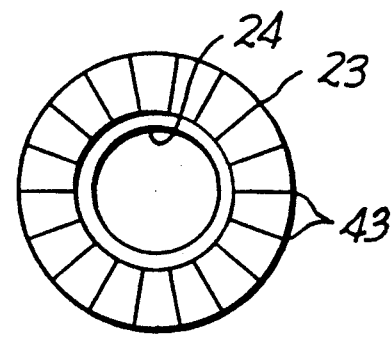
FIG. 7 shows a bottom view of the upper washer.
Figure 8:
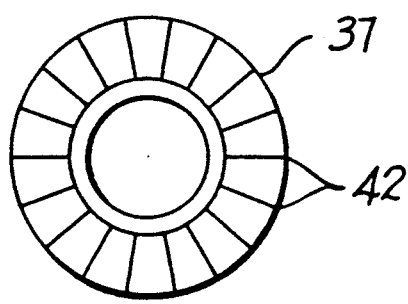
FIG. 8 is a top view of the bottom washer.
Figure 9:
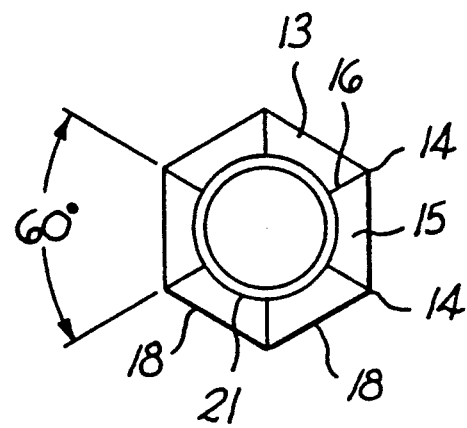
FIG. 9 is a bottom view of the nut.
Figure 10:
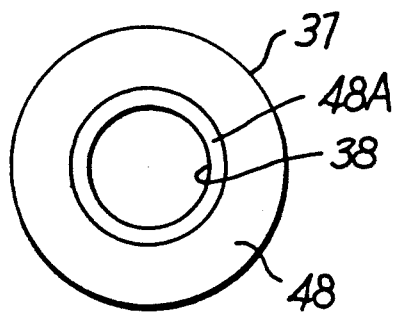
FIG. 10 is a bottom view of the lower washer.
Figure 11:
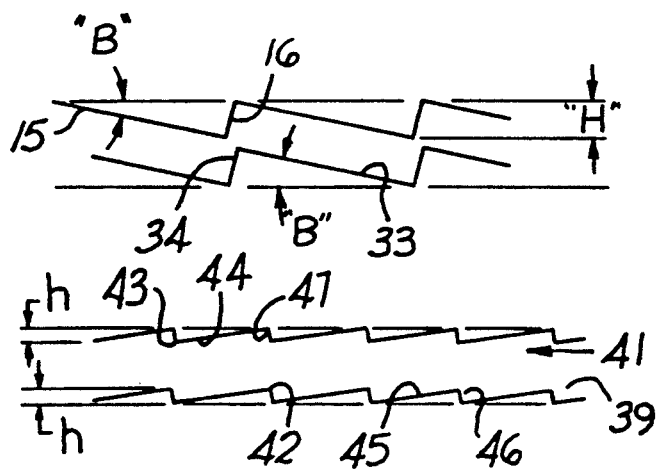
FIG. 11 shows the geometrical relations of the cam surfaces in the assembly of FIG. 1.

The drawing shows components to form a self-centering, self-tightening fastener assembly including a nut 11 having a thread 12 with a rise angle "A". One axially directed face of the nut has a wedge-action cam surface 13, FIG. 9, comprising a plurality of cam elements 14, each of which has a sloping surface 15 and an abutment surface 16. Referring to FIG. 11, the slope of each surface 15 has a steeper rise angle "B" than the rise angle "A" of thread 12 and in the same direction of rotation, while the slope of each surface 16 slopes steeply in the opposite direction to the beginning of the next cam element 14.

Nut 11 has a typical hexagonal configuration with six driving surfaces 18 that are parallel to the central axis 19 of the nut. Accordingly, surface 13 has six cam elements 14 angularly spaced by an angle of 60°, with each of the abutment surfaces 16 extending generally radially out to a respective one of the corners defined by intersections between adjacent driving surfaces.

Referring to FIGS. 3 and 5, a tubular skirt 21 extends axially from fastener cam surface 13. Skirt 21 is flared at its outer end 22. The maximum external diameter of the skirt is at outer end 22. The skirt has a minimum external diameter in the region between surface 13 and end 22.

A first upper annular washer 23 has an inwardly directed flange 24 adjacent one end 25, and a bore 26 of a larger diameter below the flange. The innermost surface of flange 24 defines the minimum internal diameter of washer 23, and is slightly larger than the minimum external diameter of skirt 21. Thus, washer 23 is loosely held by skirt 20 to rotate freely thereon.

In assembling the fastener, washer 23 must be placed on skirt 21 before the outer end of the latter is flared out at end 22. The internal diameter of bore 26 is larger than flared end 22 in order not to interfere with rotation of the washer on the skirt.

In this embodiment, the overall axial length of washer 23 from the outermost points of end 25 to the outermost points of end 27 is greater than the length of the skirt from surface 13 to end 22, which keeps the skirt from scraping on a recessed workpiece 28 when nut 11 is threaded on a bolt or stud 30 to apply a load on workpiece 28.

Referring to FIGS. 4 and 11, surface 31 at the upper axial end 25 of washer 23 constitutes a cam surface with a first set of cam elements 32 spaced 60° apart, each comprising a sloping face 33 and an abutment face 34 shaped to match corresponding surfaces of the fastener cam elements 14. Thus, each of the abutment faces 34 extends substantially radially from the inner edge of flange 24. As a result, rotating nut 11 in the direction to apply a load to workpiece 28 causes each of the abutment surfaces 16 to drive the corresponding abutment face 34. If nut 11 alone is rotated in the opposite direction in an attempt to reduce the load on the workpiece, surfaces 15 slide up on surfaces 33 in a wedging action that locks the nut against any substantial rotation and even tends to increase the load on the workpiece. In order to avoid this wedging action, washer 23 must be turned simultaneously with nut 11. Washer 23 is therefore provided with a drive head 36 that can be gripped by a tool to turn the washer. Preferably, the drive head 36 has the same configuration and size as driving surfaces 18 on nut 11 with which it is juxtaposed, thus allowing a single tool to engage both drive head 36 and nut 11.

The assembly has a second annular washer 37 with a central aperture 38 of larger internal diameter than the external diameter of end 22 of the skirt. Washer 37 has an axial surface 39 that faces surface 41 of washer 23. In accordance with this invention, surfaces 39 and 41 are cam surfaces with cam elements 42 and 43, respectively. These cam elements have a height "h" that is not as high as the height "H" of cam elements 14 and 32. The height "H" for a nut having a distance of about 1½" between parallel surfaces 18 and intended to be used to mount truck tires is about 0.005", whereas the height "h" for the cam surfaces 39 and 41 (FIG. 11) is on the order of 0.001".

Another difference between the cam elements on cam surface 41, and the cam elements on the opposite surface is that the angle between adjacent cam elements 43 is substantially less than the angle between cam elements 32. The angle between adjacent cam elements 32 should be about three times as great as the angle between cam elements 43. Thus, there are about 18 cam elements 43, and the same number of cam elements 42, for an assembly having a hexagonal drive head.

A further difference between the configuration of cam elements 42 and 43, and cam elements 14 and 32 is that the slanting surfaces 44 of cam elements 43 slope in the reverse direction from the sloping faces 33 of cam elements 32. The slanting faces 45 of the cam elements 42, of course, slope in a direction such that the cam elements 42 fit snugly with cam elements 43. Cam elements 42 have slanting abutment faces 46 that slope in the opposite direction from surfaces 45. Cam elements 43 have corresponding slanting abutment surfaces 47 that slope in the opposite direction from surfaces 44. These relative directions of slope are such that surfaces 47 tend to drive the surfaces 46 when washer 23 is rotated in the direction to reduce the load applied to workpiece 28. However, the interaction between washers 23 and 37 improves the operation of the assembly in maintaining a high tensile load on the bolt or stud 30 and in allowing the assembly to be removed and reapplied many times. As nut 11 is rotated to tighten the fastener assembly, abutment surfaces 16 lock with abutment surfaces 34 to drive washer 23 therewith. Cam elements 43 ride up on cam elements 42 as nut 11 is tightened adding tensile stress to the bolt or stud 30, thereby increasing the tensioning effect of nut 11 on the stud or bolt 30. When nut 11 is rotated such as to loosen the fastener assembly, cam elements 42 and 43 ride down one another, releasing tensile stress, until abutment surfaces 46 and 47 lock and washer 37 rotates as a unit with washer 23. The release of tensile stress facilitates the removal of the fastener assembly.

The face 48 of washer 37 is annular and has a bearing surface 48A comprising a continuous annular spherical zone having a center of curvature lying on axis 19. Bearing surface 48A is formed to be self-centering in a concave annular seat 48B in the workpiece. Washer face 48, is relatively smooth so as not to score the surface of the workpiece.

The operation of the assembly is further substantially improved by a lubricating coating 55, such as a mixture of a dry film lubricant and phosphate, on the interface between the cam surfaces 39 and 41, although the assembly will work without that coating. The lubricant reduces the friction between washer 23 and washer 37. This allows washer 23 to slip over washer 37, permitting washer 37 to tend to remain stationary on the workpiece while nut 11 and washer 23 are being rotated to tighten the assembly. This further enhances the ability of the fastener to operate without scoring or galling the workpiece.

Washer 23, in this embodiment, is attached in axial alignment with nut 11 by the skirt and flared end 22. The second washer 37 is attached to the first washer by an annular clip 49 that engages the perimeter of an outwardly extending flange 50 at the end 27 of washer 23, and perimeter 51 of washer 37, which is substantially the same size as flange 50.

Clip 49 is in the form of a circular band having an axial length approximately the same as the combined axial lengths of the perimeters of washer 37 and flange 50. The clip is held in place by several tabs 52 that extend over the edge of the flange 50 and a collar 53 (FIG. 3) that extends over the edge of washer 37. In order to keep collar 53 from scraping the surface of the workpiece, the edge of the washer 37 has a small step 54 formed in it, the axial length of which is greater than the thickness of collar 53.

It will be understood by those skilled in the art that modifications may be made in the structure described herein without departing from the true scope of the invention.

What is claimed is:

1. A self-centering, self-tightening fastener for coacting with a threaded stud or bolt to apply tightening force to a workpiece, comprising:

a threaded nut for applying tensile stress to said stud or bolt when tightened thereon;

a first non-flexing washer;

first camming means, on said nut and said first washer, for driving both said nut and said first washer when said nut is tightened on said stud or bolt and for locking said nut or said stud or bolt when said nut alone is loosened on said stud or bolt;

a second non-flexing washer having a smooth, workpiece-contacting surface including an annular crown adapted to seat in a mating recess of said workpiece; and second camming means, on said first washer and said second washer, for adding tensile stress to said bolt or stud in addition to the tensile stress imposed by said threaded nut, thereby increasing the tensioning effect of said nut on said stud or bolt, and for allowing said first washer to slide over said second washer when said second washer comes into contact with said workpiece, whereby the smooth workpiece contacting surface of the second washer in combination with the lack of movement of the second washer on the workpiece tends to prevent galling of the workpiece.

2. The fastener of claim 1 wherein the threads of said threaded nut has a preselected rise angle, and said first camming means comprises a plurality of mating first cam elements, each of said first cam elements having a sloping face and an abutment face, said sloping faces sloping in the same direction as said rise angle of said threads of said threaded nut and said sloping faces having a rise angle greater than the rise angle of said threads of said threaded nut, said plurality of mating first cam elements comprising one set of cam elements on said threaded nut and another set of cam elements on said first washer.

3. The fastener of claim 2 wherein said second camming means comprises a plurality of mating second cam elements, each of said second cam elements having a sloping face and an abutment face, said sloping faces of said second cam elements sloping in the opposite direction as the sloping faces of said first cam elements, and said plurality of mating second cam elements comprising one set of cam elements on said first washer and another set of cam elements on said second washer.

4. The fastener of claim 3 wherein the rise angle of the sloping faces of said first camming means is greater than the rise angle of the sloping faces of said second camming means.

5. The fastener of claim 4 wherein said second camming means has more cam elements than said first camming means and the axial height of each of said first cam elements is greater than the axial height of said second cam elements.

6. The fastener of claim 5 further comprising a lubricating coating on the interface between the cam elements of said second camming means.

7. The fastener of claim 1 further comprising first connecting means for loosely connecting said nut and said first washer and second connecting means for loosely connecting said first washer and said second washer.

8. The fastener of claim 7 wherein said first connecting means comprises a skirt extending from said nut, said skirt being flared outwardly at its free end, said first washer having an internal aperture which coacts with said flared end of said skirt to maintain said first washer connected loosely with said nut, and said second connecting means comprises clip means loosely connecting the outer peripheral edges of said first and second washers.

9. The fastener of claim 8 wherein said clip means comprises means for partially encircling said outer peripheral edges of said first and second washer means and includes means extending over said outer peripheral edges of said first and second washer means.

10. The fastener of claim 9 wherein said second washer includes an annular face with a recess at its outer edge to receive a portion of said clip means.

11. The fastener of claim 10 wherein said clip means comprises an annular band having: (a) an axial length substantially equal to the combined axial lengths of the outer perimeters of said first and second washers, (b) a set of tabs extending from one of its axial ends and overlapping the perimeter of one of said first and second washers, and (c) a collar extending from its opposite axial end and overlapping the perimeter of the other of said first and second washers.

12. The fastener of claim 1 wherein said crown on said second washer includes annular, convex seat means for interfitting into a complementary recess in said workpiece such that said second washer is self-aligning in said recess, and said stud or bolt extends from within said recess.

13. The fastener of claim 12 wherein said seat means is conical.

14. The fastener of claim 12 wherein said seat means is spherical.

15. The fastener of claim 1 further comprising external drive means on both said threaded nut and said first washer, whereby said nut and said first washer can be simultaneously tightened by application of an appropriate tool to said nut means alone, and said first washer and said nut means can be simultaneously loosened by application of said appropriate tool to said first washer means alone or to said first washer means and said nut means together.

16. The fastener of claim 15 wherein said drive means comprises six flat sides.

17. The fastener of claim 1 wherein said first and second camming means are axially aligned when placed on said stud or bolt.

18. A self-centering fastener assembly for releasably applying a load to the recessed surface of a workpiece, said assembly comprising:
(a) a fastener body having:
(i) a threaded opening extending therethrough along an axis, the thread having a lead angle,
(ii) first external tool-engaging means to receive a tool for rotating the fastener body about the axis in either a first direction for applying a load against a workpiece, or in the opposite direction for releasing the load from the workpiece,
(iii) an axially directed fastener cam face with a plurality of fastener cam elements that extend axially from a base surface and are angularly spaced by a first predetermined angle, each cam element having a sloping surface that slopes away from the base surface at a first rise angle greater than the lead angle and in the same rotational direction, and an abutment surface that slopes toward the base surface, and
(iv) a skirt extending axially from the fastener cam face by a predetermined length and having means defining a maximum external diameter at a first location spaced from the fastener body and a minimum external diameter at a second location between the fastener body and said first location;
(b) a first annular locking washer rotatably mounted on the skirt substantially coaxially therewith and having:
(i) means defining a central opening with a minimum internal diameter greater than the minimum external diameter of the skirt and less than the maximum external diameter of the skirt,
(ii) a first axially directed washer cam face that faces the fastener cam face and comprises a first base washer surface with a first plurality of washer cam elements extending therefrom and each first cam element comprising a sloping surface that slopes away from the base washer surface along a rise angle substantially equal to the rise angle of the sloping surface of each fastener cam element, the washer cam elements being angularly spaced by angles commensurate with the angles between the fastener cam elements, whereby the sloping surfaces of the first plurality of washer cam elements can fit substantially flush against the sloping surfaces of the fastener cam elements, each washer cam element also comprising an abutment surface sloping toward the base washer surface, (iii) a second axially directed washer cam face that comprises a second base washer surface with a second plurality of washer cam elements extending therefrom and angularly spaced by a second predetermined angle and each second cam element comprising a first surface that rises at a second rise angle and in the opposite direction from the sloping surfaces of the first plurality of washer cam elements, and a second surface that slopes toward the second washer base surface;

(c) a second annular locking washer having:
  (i) means defining a central opening,
  (ii) a third axially directed washer cam face that comprises a third base surface and a third plurality of washer cam elements extending therefrom and each third cam element comprising a first surface and a second surface, each of the first surfaces of the third plurality of washer cam elements slanting at substantially the second rise angle, adjacent ones of the third plurality of washer cam elements being angularly spaced apart by angles commensurate with the second predetermined angle, whereby the first surfaces of the third plurality of washer cam elements can fit substantially flush against the first surfaces of the second plurality of washer cam elements, the second surfaces of each of the third plurality of washer cam elements sloping toward the third base surface, the combined thickness of both of the washers, when the second and third washer cam faces are in surface-to-surface contact with each other, being greater than the axial length of the skirt, the first locking washer being axially movable on the skirt to an axial position in which the abutment surfaces of the washer cam elements engage the abutment surfaces of the fastener cam elements to cooperate therewith to rotate the first locking washer with the fastener body in the first direction, the sloping surfaces on the fastener cam elements wedging against the sloping surfaces on the first washer cam elements to prevent free rotation of the fastener body in the opposite direction, and
  (iii) an annular face generally perpendicular to the axis to engage a workpiece, the annular face having an outer, circumferential border with a diameter at least substantially as great as that of the tool-engaging structure on the fastener body, an inner diameter at least as great as the maximum diameter of the skirt and including a bearing surface comprising a continuous annular spherical zone having a center of curvature lying on said axis, the bearing surface being seatable in the recessed surface of the workpiece;

(d) means to hold the second washer in face-to-face relationship with respect to the first washer;

(e) second external tool-engaging means on at least one of the washers to rotate at least that washer about the axis in said opposite direction simultaneously with rotation of the fastener body in said opposite direction, whereby the washers and the fastener body are loosened from the workpiece; and (f) the means to hold the second washer in face-to-face relationship to the first washer comprises clip means receiving the outer peripheral edges of said washers.

19. A self-centering fastener assembly for releasably applying a load to the recessed surface of a workpiece, said assembly comprising:

(a) a fastener body having:
  (i) a threaded opening extending therethrough along an axis, the thread having a lead angle,
  (ii) first external tool-engaging means to receive a tool for rotating the fastener body about the axis in either a first direction for applying a load against a workpiece, or in the opposite direction for releasing the load from the workpiece,
  (iii) an axially directed fastener cam face with a plurality of fastener cam elements that extend axially from a base surface and are angularly spaced by a first predetermined angle, each cam element having a sloping surface that slopes away from the base surface at a first rise angle greater than the lead angle and in the same rotational direction, and an abutment surface that slopes toward the base surface, and
  (iv) a skirt extending axially from the fastener cam face by a predetermined length and having means defining a maximum external diameter at a first location spaced from the fastener body and a minimum external diameter at a second location between the fastener body and said first location;

(b) a first annular locking washer rotatably mounted on the skirt substantially coaxially therewith and having:
  (i) means defining a central opening with a minimum internal diameter greater than the minimum external diameter of the skirt and less than the maximum external diameter of the skirt,
  (ii) a first axially directed washer cam face that faces the fastener cam face and comprises a first base washer surface with a first plurality of washer cam elements extending therefrom and each first cam element comprising a sloping surface that slopes away from the base washer surface along a rise angle substantially equal to the rise angle of the sloping surface of each fastener cam element, the washer cam elements being angularly spaced by angles commensurate with the angles between the fastener cam elements, whereby the sloping surfaces of the first plurality of washer cam elements can fit substantially flush against the sloping surfaces of the fastener cam elements, each washer cam element also comprising an abutment surface sloping toward the base washer surface,
  (iii) a second axially directed washer cam face that comprises a second base washer surface with a second plurality of washer cam elements extending therefrom and angularly spaced by a second predetermined angle and each second cam element comprising a first surface that rises at a second rise angle and in the opposite direction from the sloping surfaces of the first plurality of washer cam elements, and a second surface that slopes toward the second washer base surface;

(c) a second annular locking washer having:
  (i) means defining a central opening,
  (ii) a third axially directed washer cam face that comprises a third base surface and a third plurality of washer cam elements extending therefrom and each third cam element comprising a first surface and a second surface, each of the first surfaces of the third plurality of washer cam elements slanting at substantially the second rise angle, adjacent ones of the third plurality of washer cam elements being angularly spaced apart by angles commensurate with the second predetermined angle, whereby the first surfaces of the third plurality of washer cam elements can fit substantially flush against the first surfaces of the second plurality of washer cam elements, the second surfaces of each of the third plurality of washer cam elements sloping toward the third base surface, the combined thickness of both of the washers, when the second and third washer cam faces are in surface-to-surface contact with each other, being greater than the axial length of the skirt, the first locking washer being axially movable on the skirt to an axial position in which the abutment surfaces of the washer cam elements engage the abutment surfaces of the fastener cam elements to cooperate therewith to rotate the first locking washer with the fastener body in the first direction, the sloping surfaces on the fastener cam elements wedging against the sloping surfaces on the first washer cam elements to prevent free rotation of the fastener body in the opposite direction, and (iii) an annular face generally perpendicular to the axis to engage a workpiece, the annular face having an outer, circumferential border with a diameter at least substantially as great as that of the tool-engaging structure on the fastener body, an inner diameter at least as great as the maximum diameter of the skirt and including a bearing surface comprising a continuous annular spherical zone having a center of curvature lying on said axis, the bearing surface being seatable in the recessed surface of the workpiece;

(d) means to hold the second washer in face-to-face relationship with respect to the first washer;

(e) second external tool-engaging means on at least one of the washers to rotate at least that washer about the axis in said opposite direction simultaneously with rotation of the fastener body in said opposite direction, whereby the washers and the fastener body are loosened from the workpiece; and (f) the means to hold the second washer in face-to-face relationship to the first washer comprises a clip means that at least partially encircles both washers and includes means extending over the edges of both washers.

20. The fastener assembly of claim 19, in which the annular face of the second washer has a recess at its outer edge to receive a portion of the clip means to hold the second washer adjacent to the first washer.

21. The fastener assembly of claim 20 in which the clip means comprises an annular band having:

(a) an axial length substantially equal to the combined axial lengths of the outer perimeters of the washers;

(b) a set of tabs extending from one of its axial ends and overlapping the perimeter of the first washer; and (c) a collar extending from its opposite axial end and overlapping the perimeter of the second washer.

* * * * *